US012023721B2

(12) United States Patent
Uemoto

(10) Patent No.: US 12,023,721 B2
(45) Date of Patent: Jul. 2, 2024

(54) WIRE WINDING DEVICE AND WIRE TREATMENT SYSTEM

(71) Applicant: Neturen Co., Ltd., Tokyo (JP)

(72) Inventor: Toshifumi Uemoto, Tokyo (JP)

(73) Assignee: Neturen Co., Ltd., Tokyo (JP)

( * ) Notice: Subject to any disclaimer, the term of this patent is extended or adjusted under 35 U.S.C. 154(b) by 487 days.

(21) Appl. No.: 17/130,967

(22) Filed: Dec. 22, 2020

(65) Prior Publication Data

US 2021/0197243 A1 Jul. 1, 2021

(30) Foreign Application Priority Data

Dec. 27, 2019 (JP) ................................ 2019-237969

(51) Int. Cl.

| | |
|---|---|
| ***B21C 47/04*** | (2006.01) |
| ***B21C 1/02*** | (2006.01) |
| ***B21C 47/30*** | (2006.01) |
| ***B65H 54/58*** | (2006.01) |
| ***H01B 13/00*** | (2006.01) |

(52) U.S. Cl.

CPC ................ *B21C 47/04* (2013.01); *B21C 1/02* (2013.01); *B21C 47/30* (2013.01); *B65H 54/58* (2013.01); *H01B 13/0003* (2013.01); *B65H 2701/36* (2013.01); *H01B 13/0016* (2013.01); *H01B 13/0036* (2013.01)

(58) Field of Classification Search

CPC .... B65H 54/58; B65H 2701/36; B21C 47/04; B21C 47/30; B21C 1/02; B21C 9/00

See application file for complete search history.

(56) References Cited

U.S. PATENT DOCUMENTS 2,620,995 A * 12/1952 Larcinese .............. B21C 47/04 72/289
5,409,179 A * 4/1995 Leclerc ................. B65H 75/22 242/573

FOREIGN PATENT DOCUMENTS

CN 103449262 A 12/2013
CN 108946307 A 12/2018
JP 2009166984 A * 7/2009

* cited by examiner

*Primary Examiner* — William E Dondero
(74) *Attorney, Agent, or Firm* — RANKIN, HILL & CLARK LLP

(57) ABSTRACT

A rotary body including a drum and a wire support member winds a wire by rotation. A spacer is provided on the rotary body and is displaceable to a first position and a second position in the rotary body. When the spacer is in the first position, the wire is wound on the rotary body not via the spacer, and hence the wire is wound with the first diameter. When the spacer is in the second position, position, the wire is wound on the rotary body via the spacer, and hence the wire is wound with a second diameter larger than the first diameter.

3 Claims, 5 Drawing Sheets

WIRE WINDING DEVICE AND WIRE TREATMENT SYSTEM

BACKGROUND

Technical Field

The present embodiment relates to a wire winding device that winds a wire and a wire treatment system

Related Art

Conventionally, there has been known a wire treatment system that performs wire treatment by passing a long steel wire through a wire treatment device. This wire treatment includes heat treatment such as quenching and molding such as wire drawing.

There is known a method of, in a wire treatment system, performing wire treatment by feeding a coiled wire wound on a drum or the like while sequentially unwinding it, and winding the treated wire by a rotary drum or the like to provide a coiled wire again. As a technique related to this method, for example, JP-A-2015-140210 discloses that a bundling wire is inserted when a long workpiece is wound on a drum a plurality of times to form a bundle of long workpiece.

SUMMARY

For example, when a wire is wound by a drum, the winding diameter of the wound wire is determined depending on the size of the drum. However, the required winding diameter may vary depending on the manufacturing line using the wound wire and the conditions such as transportation and storage of the wound wire.

On the other hand, for example, a method of replacing the drum according to the required winding diameter is conceivable, but there is a problem that a large scale facility for replacing the drum is required and that replacement of the drum is time-consuming. Since it is necessary to prepare a place to put a replacement drum, there is a problem that the surrounding space is compressed.

A method of detachably configuring a spacer for adjusting the winding diameter of a wire for one drum is also conceivable, but in this case, there is also a problem that it takes time to replace the spacer, and a problem that a peripheral space is compressed due to the place to put the removed spacer.

The present embodiment has been made in view of the above circumstances, and it is possible to provide a wire winding device and a wire treatment system that are possible to easily switch a winding diameter when winding a wire.

A wire winding device according to one aspect of the present disclosure includes: a rotary body that winds a wire by rotation; and a spacer provided on the rotary body and displaceable to a first position and a second position in the rotary body, wherein when the spacer is in the first position, the wire is wound on the rotary body not via the spacer, and hence the wire is wound with a first diameter, and when the spacer is in the second position, the wire is wound on the rotary body via the spacer, and hence the wire is wound with a second diameter larger than the first diameter.

A wire treatment system according to one aspect of the present disclosure includes the wire winding device and a wire treater that performs wire treatment including at least any of heat treatment and molding on the wire, and the rotary body winds the wire for which the wire treatment has been performed by the wire treater.

According to the present disclosure, it is possible to provide a wire winding device and a wire treatment system that are possible to easily switch a winding diameter when winding a wire.

DETAILED DESCRIPTION

An embodiment of the present disclosure will be described below with reference to the drawings.

(Example of Wire Winding Device of Present Disclosure)

Figure 1:
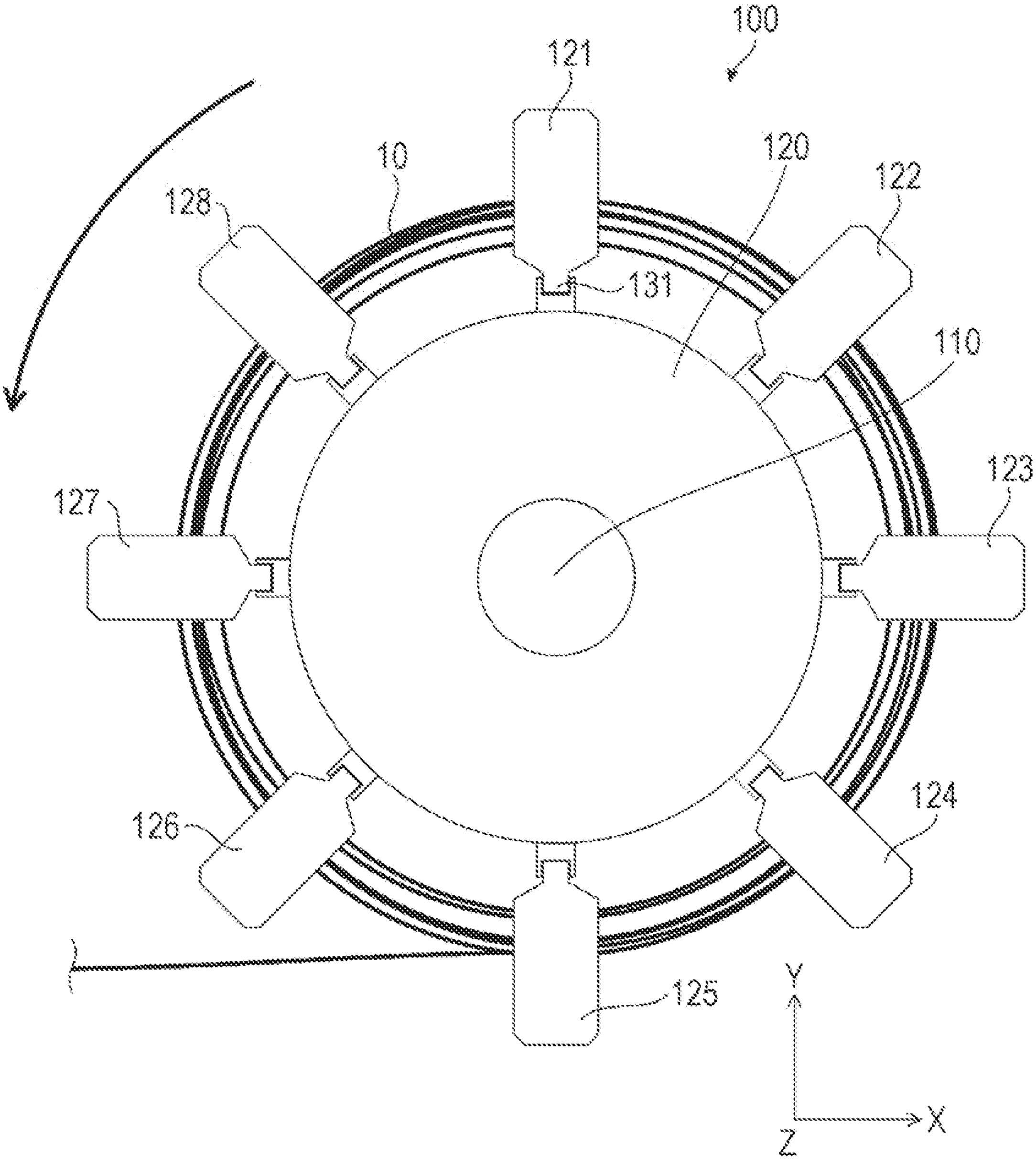
FIG. 1 is a view showing an example of a wire winding device, which is an example of a wire winding device of the present disclosure.

FIG. 1 is a view showing an example of the wire winding device 100, which is an example of a wire winding device of the present disclosure. The wire winding device 100 is a device that forms a coiled wire 10 by winding the wire 10 to be inserted into the wire winding device 100.

The wire 10 is a long material made of a metal material. The metal material is steel, for example. The wire 10 can be a long material having various cross-sectional shapes such as circular, rectangular, and triangular. The wire 10 may be a long material having a deformed cross section having an uneven cross-sectional shape.

As shown in FIG. 1, the wire winding device 100 includes a rotary shaft 110, a rotary drum 120, and wire support members 121 to 128. As will be described later, the wire winding device 100 includes the spacer 240 (See FIGS. 2 to 4, for example). Each component of the wire winding device 100 is made of a rigid member such as metal. The rotary drum 120 and the wire support members 121 to 128 constitute a rotary body that winds the wire 10 by rotation.

The rotary drum 120 rotates about the rotary shaft 110. The rotation of the rotary drum 120 is performed by an actuator not shown, for example. In the example shown in FIG. 1, the outer shape of the rotary drum 120 is cylindrical.

Here, the direction of the rotary shaft 110 (depth direction in FIG. 1) is defined as a Z direction, one direction orthogonal to the Z direction (horizontal direction in FIG. 1) is defined as an X direction, and the direction orthogonal to the Z direction and the X direction (vertical direction in FIG. 1) is defined as an Y direction. The wire 10 is inserted into the wire winding device 100 in a direction substantially parallel to the X direction.

The wire support members 121 to 128 are fixed to the rotary drum 120 at equal intervals along the circumferential direction about the rotary shaft 110. Each of the wire support members 121 to 128 supports the wire 10 from the side of the rotary shaft 110. Therefore, the wire 10 is wound around the wire support members 121 to 128 without directly touching the rotary drum 120.

Any of the wire support members 121 to 128 is provided with a tip fixing portion (not shown) capable of fixing the tip of the wire 10. By rotating the rotary drum 120 with the tip of the wire 10 fixed to the tip fixing portion, the wire 10 can be wound around the wire support members 121 to 128.

A rotary shaft 131 is a rotary shaft for displacing the side wall (movable side wall 220 described below) of the wire support member 121. Although reference numerals are omitted in FIG. 1, the wire support members 122 to 128 also have the same rotary shaft as the rotary shaft 131 of the wire support member 121. Displacement of the side wall by the rotary shaft of the wire support members 121 to 128 will be described later (See, FIG. 5, for example).

(Wire Support Member 121 and Spacer 240 Included in Wire Winding Device 100)

Figure 2:
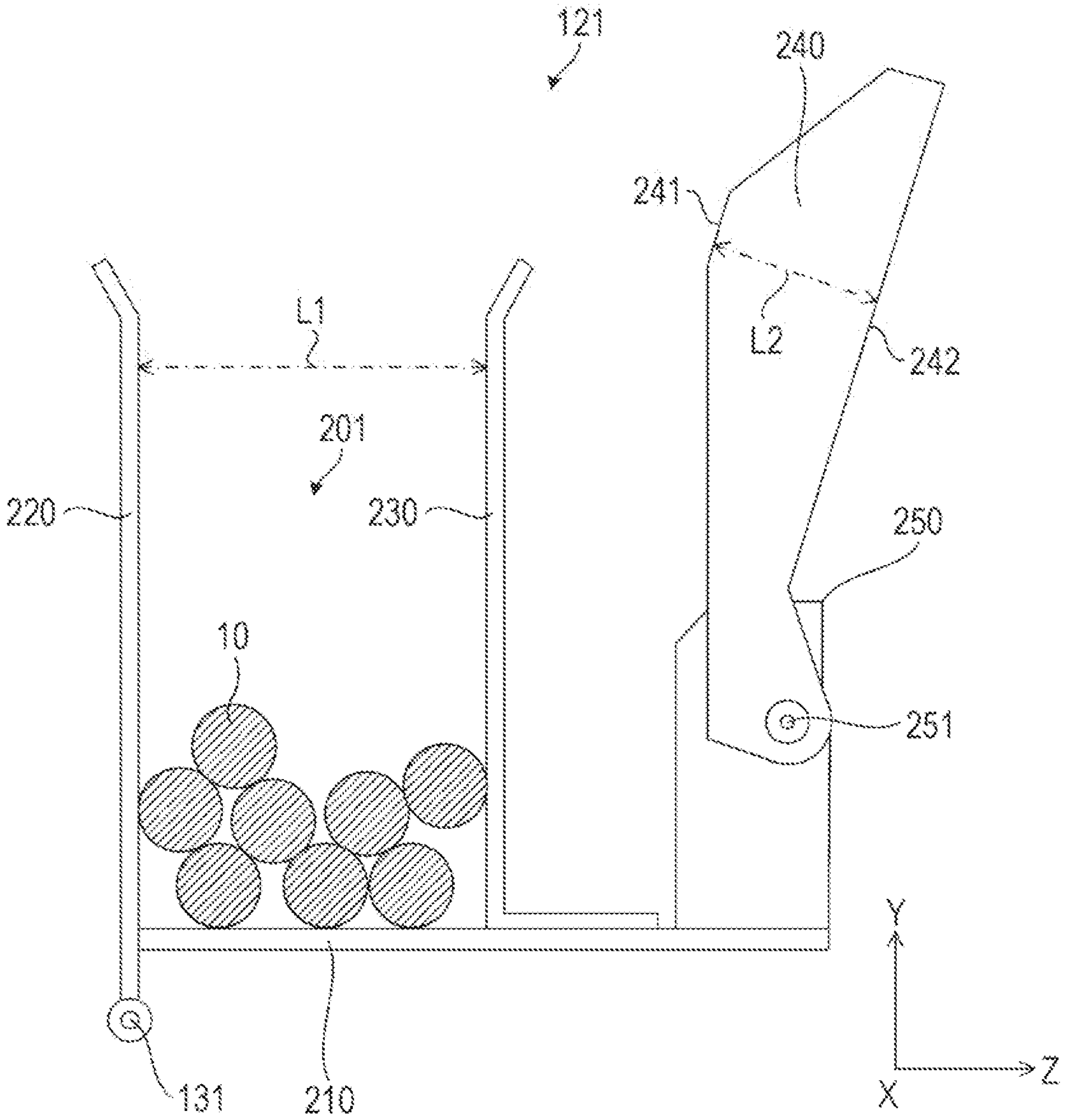
FIG. 2 is a side view (1) showing an example of a wire support member and a spacer included in the wire winding device.
Figure 3:
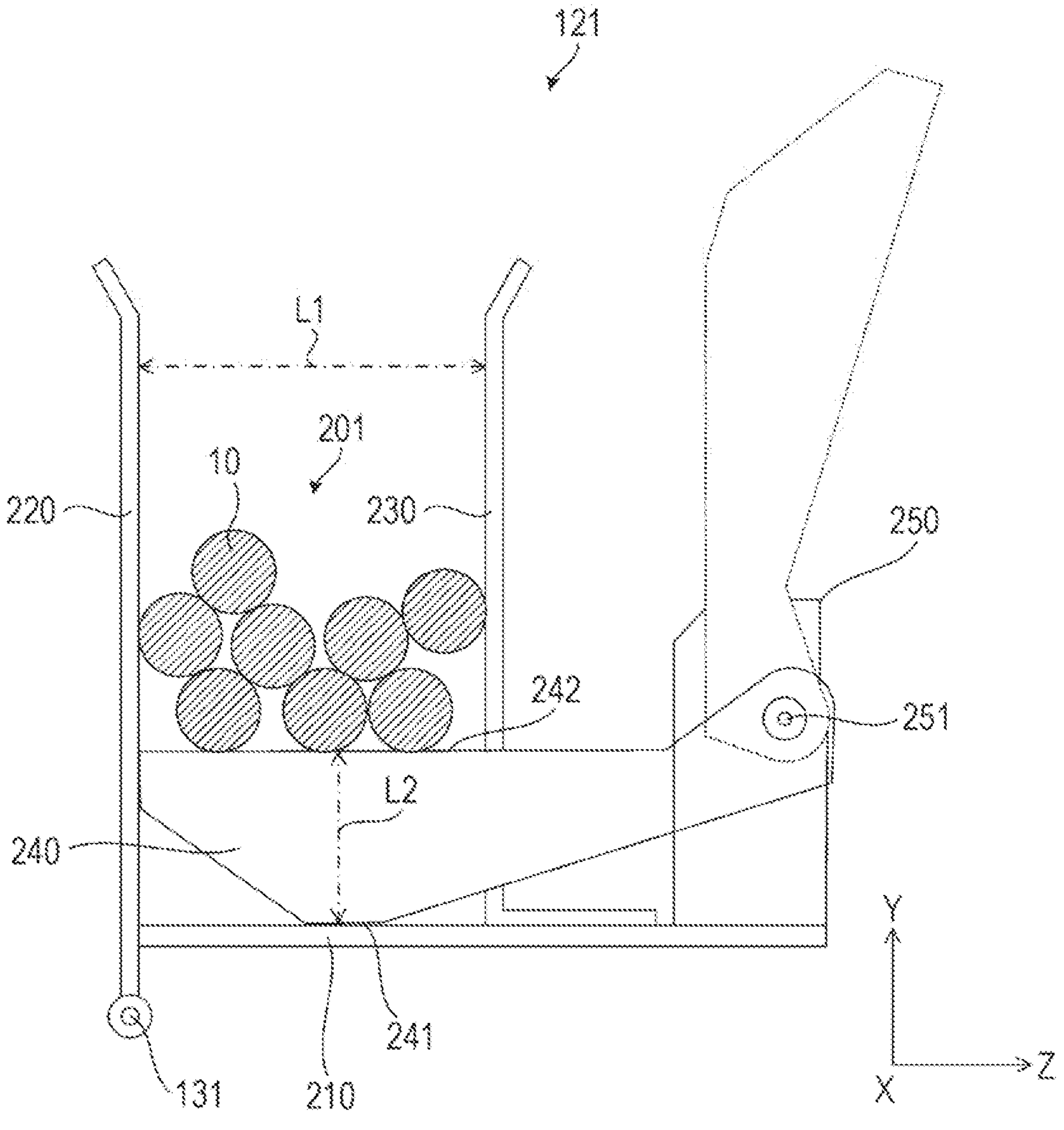
FIG. 3 is a side view (2) showing an example of the wire support member and the spacer included in the wire winding device.

FIGS. 2 and 3 are side views showing an example of the wire support member 121 and the spacer 240 included in the wire winding device 100. The configuration of the wire support member 121 will be described, and the configuration of the wire support members 122 to 128 is the same as that of the wire support member 121. FIGS. 2 and 3 show the wire support member 121 and the spacer 240 viewed from the X direction shown in FIG. 1 (circumferential direction about the rotary shaft 110).

The wire support member 121 includes a bottom 210, the movable side wall 220, and a fixed side wall 230. The bottom 210, the movable side wall 220, and the fixed side wall 230 constitute a support member including a portion that is U shaped when viewed from the X direction. The inside of the U shape becomes a housing space 201 in which the wound wire 10 is housed.

The bottom 210 constitutes a bottom surface of the housing space 201 that supports the wire 10 from the side of the rotary shaft 110. Specifically, the bottom 210 is a flat plate member fixed to the rotary drum 120 so as to be substantially orthogonal to the Y direction in FIG. 2. The bottom 210 may be curved along the circumferential direction about the rotary shaft 110.

The movable side wall 220 and the fixed side wall 230 constitute a pair of walls sandwiching the wire 10 (housing space 201). Specifically, the movable side wall 220 is a flat plate member provided in parallel with a circle about the rotary shaft 110. The movable side wall 220 is rotatable about the rotary shaft 131 in the X direction in FIG. 2. Displacement due to rotation of the movable side wall 220 will be described later (See FIG. 5, for example).

The fixed side wall 230 is a flat plate member provided so as to sandwich the housing space 201 together with the movable side wall 220 in parallel with a circle about the rotary shaft 110.

A width L1 is the distance between the movable side wall 220 and the fixed side wall 230, i.e., the width of the housing space 201 in the Z direction in FIG. 2. As an example, the width L1 can be 200 mm, but the width L1 is not limited to this and can be arbitrarily set.

The movable side wall 220 and the fixed side wall 230 sandwich the bundle of the wire 10 in the Z direction in FIG. 2, and it is hence possible to suppress the wire 10 wound on the wire winding device 100 from moving in the direction and coming off from the wire support member 121.

In the example shown in FIG. 2, the bottom 210 projects from the position of the fixed side wall 230 to the opposite side to the movable side wall 220 in the Z direction, and the projecting portion of the bottom 210 is provided with the stand 250.

The spacer 240 is rotatably provided with respect to the stand 250 about a rotary shaft 251. The rotary shaft 251 is a shaft in the X direction in FIG. 2, i.e., an axis in a direction parallel to the tangent line of the circle about the rotary shaft 110 at the position of the spacer 240.

In the state shown in FIG. 2, the spacer 240 is located at a first position on the outer periphery of the rotary body including the rotary drum 120 and the wire support members 121 to 128. When the spacer 240 is rotated about the rotary shaft 251 from this state, the spacer 240 is displaced to a second position deviated from the outer periphery of the rotary body including the rotary drum 120 and the wire support members 121 to 128, as shown in FIG. 3.

For example, the spacer 240 is bolted to the stand 250 at the position of the rotary shaft 251. A lever can be attached to the bolt, and by rotating the bolt by operation using the lever, the spacer 240 can be rotated about the rotary shaft 251. However, the rotation of the spacer 240 may be performed by power obtained by an actuator not shown, instead of manual power using the lever or the like.

The spacer 240 has a bottom surface 241 abutting against the bottom 210 when in the second position shown in FIG. 3, and a top surface 242 for supporting the wire 10 when in the second position shown in FIG. 3. The bottom surface 241 and the top surface 242 are formed to be parallel to the bottom surface 240 when the spacer 241 is in the second position shown in FIG. 3. As an example, a width L2 can be 100 mm, but the width L2 is not limited to this and can be arbitrarily set.

When the rotary drum 120 is rotated in a state where the spacer 240 is in the first position shown in FIG. 2, the wire 10 is wound not via the spacer 240, i.e., while being supported by the bottom 210, and hence the winding diameter of the wire 10 becomes relatively small.

When the spacer 240 is in the second position shown in FIG. 3, the top surface 242 becomes a surface substantially orthogonal to the Y direction in a position farther from the rotary shaft 110 by the width L2 than the bottom 210.

When the rotary drum 120 is rotated in this state (state of FIG. 3), the wire 10 is wound via the spacer 240, i.e., by being supported by the top surface 242, which is farther from the rotary shaft 110 by the width L2 than the bottom 210, and hence the winding diameter of the wire 10 becomes larger than that shown in FIG. 2.

Thus, when the spacer 240 is in the first position shown in FIG. 2, the wire 10 is wound not via the spacer 240, and hence the wire 10 is wound with the first diameter. On the other hand, when the spacer 240 is in the second position shown in FIG. 3, the wire 10 is wound via the spacer 240, and hence the wire 10 is wound with the second diameter larger than the first diameter.

Therefore, depending on which of the first position and the second position the position of the spacer 240 is set to before winding the wire 10, the winding diameter of the wound wire 10 can be switched to any of the first diameter and the second diameter. The position of the spacer 240 can be easily switched by using a lever or the like as described above.

(Top View of Wire Support Member 121 and Spacer 240 Shown in FIG. 3)

Figure 4:
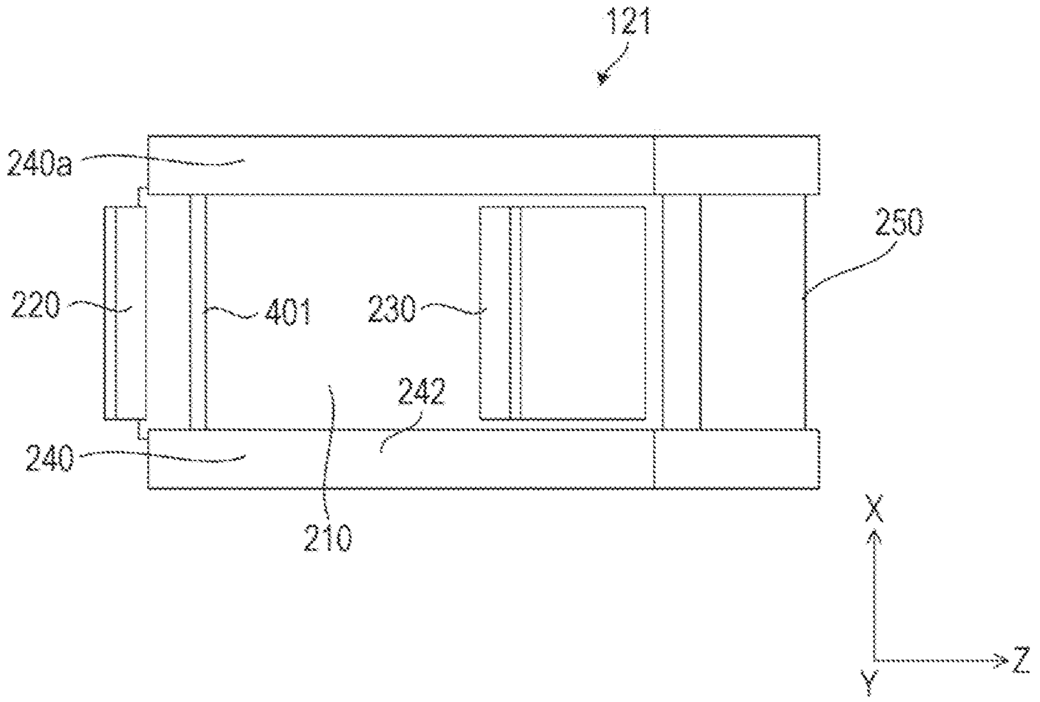
FIG. 4 is a top view showing an example of the wire support member and the spacer shown in FIG. 3.

FIG. 4 is a top view showing an example of the wire support member 121 and the spacer 240 shown in FIG. 3. FIG. 4 shows the wire support member 121 and the spacer 240 shown in FIG. 3 as viewed from the Y direction in FIG. 3.

As shown in FIG. 4, the wire support member 121 may be provided with a spacer 240*a* in addition to the spacer 240 shown in FIGS. 2 and 3. The spacer 240*a* has the same shape as that of the spacer 240, and is provided at a position opposite to the spacer 240 as viewed from the fixed side wall 230 in the X direction of FIG. 4.

Similar to the spacer 240, the spacer 240*a* is rotatable about the rotary shaft 251 of the stand 250. The end of the spacer 240*a* on the side opposite to the rotary shaft 251 and the end of the spacer 240 on the side opposite to the rotary shaft 251 are fixed to each other by a rod member 401. Therefore, the spacer 240*a* rotates with the rotation of the spacer 240.

When the spacer 240 is displaced to the first position shown in FIG. 2, the spacer 240*a* is also displaced to a position away from the wire support member 121, and the wire 10 is wound not via the spacers 240 and 240*a*. When the spacer 240 is displaced to the second position shown in FIG. 3, the spacer 240*a* is also displaced. Hence the spacers 240 and 240*a* sandwich the fixed side wall 230, and the wire 10 is wound via the spacers 240 and 240*a*.

As shown in FIG. 3, by providing the pair of spacers 240 and 240*a* to the wire support member 121, when the wire 10 is wound via the spacers 240 and 240*a*, the wire 10 can be supported at two positions of the spacers 240 and 240*a* at the position of the wire support member 121, and hence the wire 10 can be wound in a shape closer to a circle.

Since the wire support member (e.g., the wire support members 121 to 128) and the spacer (e.g., the spacers 240 and 240*a*) are provided along the outer periphery of the rotary drum 120, the space for providing the wire support member and the spacer is limited.

On the other hand, the pair of adjacent spacers (e.g., the spacers 240 and 240*a*) are provided at positions sandwiching the wire support member (e.g., the wire support members 121 to 128) in the circumferential direction about the rotary shaft 110, and it is hence possible to provide many wire support members and spacers in a limited space. Therefore, the wire 10 can be wound in a shape closer to a circle, and the wire 10 can be reliably supported so that the wire 10 does not come off of the wire winding device 100 during winding.

By fixing the spacers 240 and 240*a* to each other by the rod member 401, the spacer 240*a* can also be displaced by an operation to displace the spacer 240 (e.g., the operation by the lever described above), and it is hence possible to reduce the operation amount required for switching the winding diameter of the wire 10 by the wire winding device 100.

(Attachment of Spacer to Each Wire Support Member)

Although the spacers 240 and 240*a* provided in the wire support member 121 have been described, a spacer similar to the spacers 240 and 240*a* are provided in each of the wire support members 122 to 128.

As an example, let the inner diameter of the bundle of the wound wire 10 be 1600 mm in a case where the position of each spacer is set at the first position, i.e., in a case where the wire 10 is wound not via the spacer. Let the width L2 be 100 mm.

In this case, when the position of each spacer is set to the second position, the wire 10 is wound via each spacer, and the inner diameter of the bundle of wound wire 10 becomes 1600+100×2=1800 mm. Therefore, by switching the state where the position of each spacer is set to the first position and the state where the position of each spacer is set to the second position, the inner diameter of the bundle of the wound wires 10 can be switched to 1600 mm and 1800 mm.

However, not all the wire support members 121 to 128 may be provided with a similar spacer to the spacers 240 and 240*a*. For example, in a case where it is difficult to provide a spacer similar to the spacers 240 and 240*a* to the wire support member 128 as a result of providing the wire support member 128 with the tip fixing portion, the wire support member 128 may not be provided with the spacer.

Also in this case, in a case of winding the wire 10 with a large winding diameter, by supporting the wire 10 by the spacer of the wire support members 121 to 127, the wire 10 can be wound in a shape close to a circle even without supporting the wire 10 in the wire support member 128.

(Displacement of Movable Side Wall 220)

Figure 5:
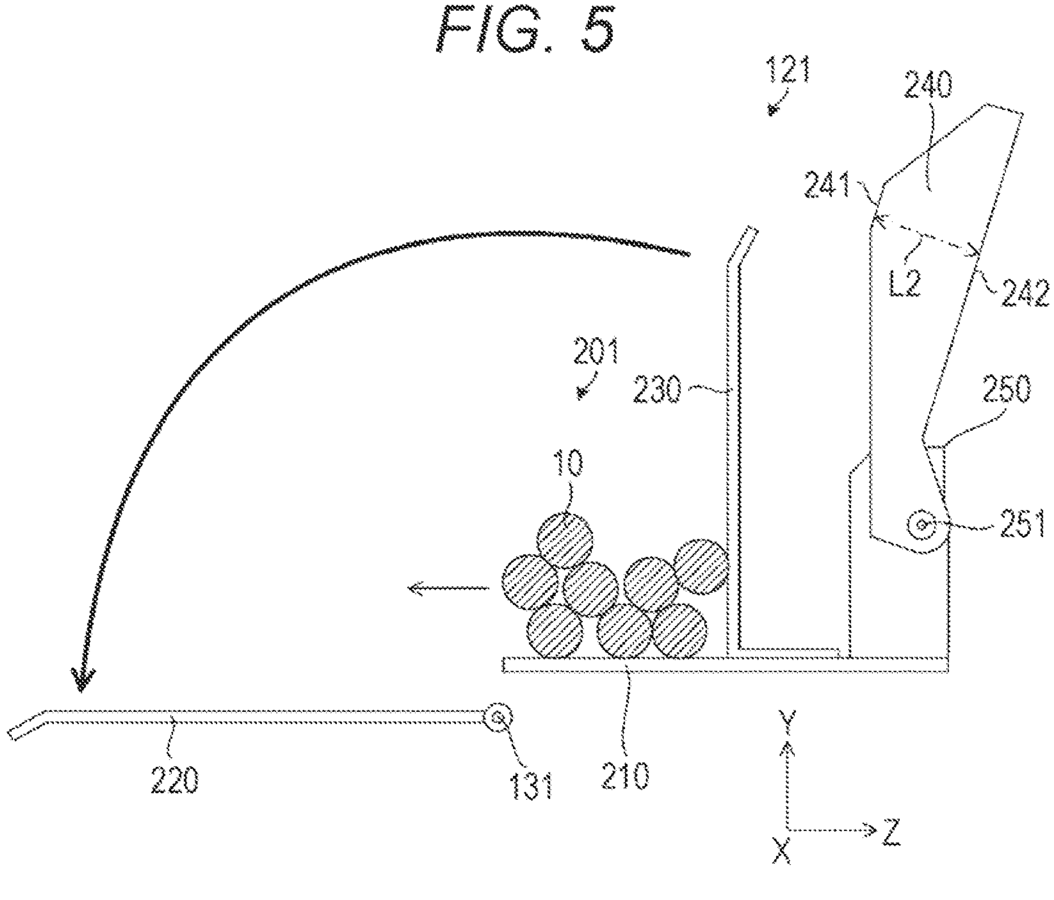
FIG. 5 is a view showings an example of displacement of a movable side wall.

FIG. 5 is a view showing an example of displacement of the movable side wall 220. For example, in a state shown in FIG. 2, after completing winding of the wire 10, the movable side wall 220 is rotated about the rotary shaft 131. Specifically, the movable side wall 220 is rotated such that the movable side wall 220 is displaced from a third position (position shown in FIG. 2) where the wire 10 is sandwiched by the movable side wall 220 and the fixed side wall 230 to a fourth position (position shown in FIG. 5) where the wire 10 is not sandwiched. The rotation of the movable side wall 220 may be performed by an attached lever similarly to the rotation of the spacer 240, or may be performed by the power obtained by an actuator not shown.

When the movable side wall 220 is in the fourth position shown in FIG. 5, it is possible to remove the wire 10 wound on the rotary drum 120 from the rotary drum 120 by moving the wire 10 in a direction parallel to the rotary shaft 110 (left direction in FIG. 5). Due to this, the coiled wire 10 is obtained in a state of being separated from the wire winding device 100, and the wire winding device 100 can start winding a new wire.

The case where the movable side wall 220 is displaced to the fourth position in the state shown in FIG. 2 and the wire 10 is removed has been described. However, similarly in the state shown in FIG. 3, the wire 10 can be removed by displacing the movable side wall 220 to the fourth position.

(Wire Treatment System to Which Wire Winding Device 100 is Applied)

Figure 6:
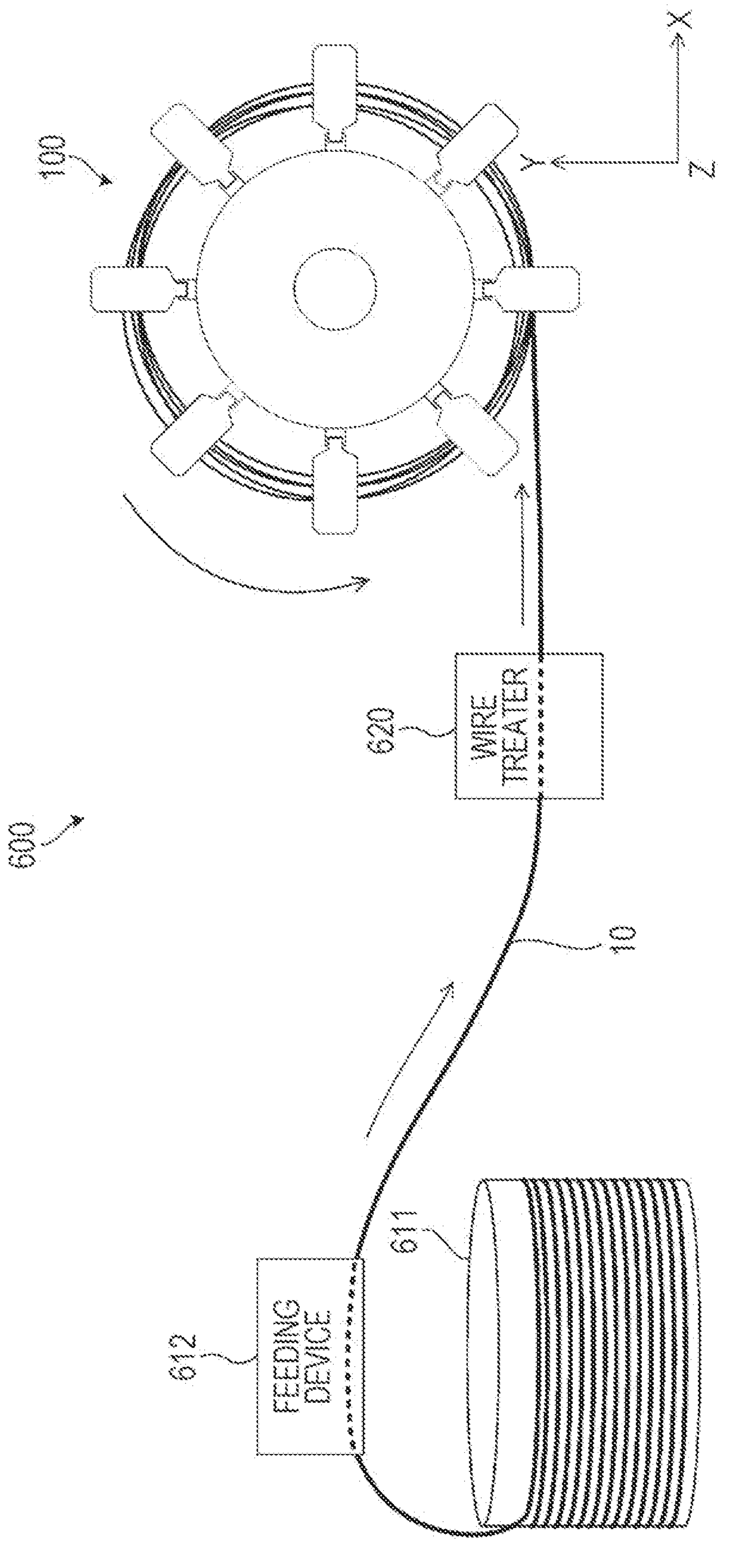
FIG. 6 is a view showings an example of a wire treatment system to which the wire winding device is applied.

FIG. 6 is a view showing an example of a wire treatment system to which the wire winding device 100 is applied. A wire treatment system 600 shown in FIG. 6 is a treatment line that performs wire treatment for the wire 10. The wire treatment for the wire 10 includes at least any of heat treatment and molding.

The heat treatment is a heat treatment such as quenching or tempering. This heat treatment is, for example, a heat treatment such as high-frequency quenching in which electromagnetic induction by high-frequency electromagnetic waves is caused to the wire 10 and the surface of the wire 10 is heated to perform quenching. However, the heat treatment is not limited to this, and may be a heat treatment by a method other than electromagnetic induction.

The molding is, for example, wire drawing in which the wire 10 is drawn to reduce the diameter of the wire 10. However, the molding is not limited to this, and may be, for example, indenting in which a deformed cross section is formed by rolling an indent roll on the wire 10, or other various treatments for the wire 10.

As shown in FIG. 6, the wire treatment system 600 includes a drum 611, a feeding device 612, a wire treater 620, and the wire winding device 100. The wire 10 before being subjected to wire treatment by the wire treater 620 is coiled on the drum 611.

The feeding device 612 feeds the wire 10 wound on the drum 611 while sequentially unwinding it from the tip of the wire 10. The wire 10 having been fed from the feeding device 612 is fed toward the wire winding device 100 (right direction in FIG. 6) at a constant speed by a delivery device not shown. This delivery device is provided at least between the wire treater 620 and the wire winding device 100, and delivers the wire 10 by pulling the wire 10.

The wire treater 620 performs the above-described wire treatment for the wire 10 having been fed by the feeding device 612 and passing through the wire treater 620. The wire winding device 100 winds the wire 10 for which the wire treatment has performed by the wire treater 620. Due to this, the wire 10 for which the wire treatment has performed by the wire treater 620 can be coiled again.

In FIG. 6, the configuration in which the feeding device 612 feeds the wire 10 wound on the drum 611 while sequentially unwinding it has been described, but the wire treatment system 600 is not limited to this configuration, and the wire before being subjected to the wire treatment by the wire treater 620 may not be wound on the drum 611.

Thus, in the wire winding device 100, the rotary body (e.g., the rotary body including the rotary drum 120 and the wire support members 121 to 128) is provided with the spacer (e.g., the spacer 240) that is displaceable to the first position and the second position in the rotary body.

When the spacer is in the first position, the wire is wound on the rotary body not via the spacer, and hence the wire is wound with the first diameter (See FIG. 2, for example). When the spacer is in the second position, the wire is wound on the rotary body via the spacer, and hence the wire is wound with the second diameter larger than the first diameter (See FIG. 3, for example).

Due to this, the winding diameter at the time of winding the wire can be easily switched by displacing the spacer to any of the first position and the second position before winding the wire.

According to the wire winding device 100, it is possible to shorten the time required for switching the winding diameter, compared with the configuration in which the winding diameter is switched by attaching or detaching the spacer to from the rotary body, for example.

In the method of switching the winding diameter by attaching or detaching the spacer to or from the rotary body, it is necessary to secure a place to put the removed spacer. According to the wire winding device 100, however, it is not necessary to secure such a place, and it is hence possible to reduce the place required for the work.

(Modification of Wire Winding Device 100)

Although the configuration in which the rotary drum 120 has a cylindrical shape has been described, the rotary drum 120 is not limited to have a cylindrical shape as long as the rotary drum 120 rotates about the rotary shaft 110 and can support the wire support members 121 to 128 at the position shown in FIG. 1.

Although the configuration in which the rotary drum 120 is provided with the wire support members 121 to 128 has been described, the configuration is not limited to this. For example, a configuration in which the rotary drum 120 is provided with only the wire support members 121, 123, 125, and 127 of the wire support members 121 to 128 may be adopted. That is, the plurality of wire support members is only required to be provided so as to have a point-symmetrical relationship about the rotary shaft 110.

As described above, the wire winding device disclosed in the present description includes: a rotary body that winds a wire by rotation; and a spacer provided on the rotary body and displaceable to a first position and a second position in the rotary body, wherein when the spacer is in the first position, the wire is wound on the rotary body not via the spacer, and hence the wire is wound with a first diameter, and when the spacer is in the second position, the wire is wound on the rotary body via the spacer, and hence the wire is wound with a second diameter larger than the first diameter.

In the wire winding device disclosed in the present description, a plurality of the spacers is provided along the circumferential direction about the rotary shaft of the rotary body.

In the wire winding device disclosed in the present description, the spacer is displaced to the first position or the second position by rotating about a shaft fixed to the rotary body in a direction parallel to a tangent line of a circle about a rotary shaft of the rotary body.

In the wire winding device disclosed in the present description, a lever can be attached to the spacer, and the spacer rotates by an operation of the lever attached to the spacer.

In the wire winding device disclosed in the present description, the rotary body includes a support member including a U shape holding and supporting the wound wire in a direction parallel to a rotary shaft of the rotary body, and when the spacer is in the first position, the wire is wound inside the support member not via the spacer, and when the spacer is in the second position, the wire is wound inside the support member via the spacer.

In the wire winding device capable of matters disclosed in the present description, the support member including the U shape includes a pair of walls holding the wire in a direction parallel to a rotary shaft of the rotary body, and a bottom supporting the wire from a side of a rotary shaft of the rotary body, and at least any of the pair of walls is displaceable from a third position holding the wire to a fourth position different from the third position, and when at least any of the pair of walls is in the fourth position, the wire wound on the rotary body is removed from the rotary body by moving in a direction parallel to a rotary shaft of the rotary body.

In the wire winding device disclosed in the present description, a plurality of the spacers is provided along a circumferential direction about a rotary shaft of the rotary body, and a pair of the adjacent spacers is provided at positions sandwiching the support member in a circumferential direction about a rotary shaft of the rotary body.

In the wire winding device disclosed in the present description, the pair of spacers is fixed to each other.

The wire treatment system disclosed in the present description includes the wire winding device according to claim 1, and a wire treater that performs a wire treatment including at least any of heat treatment and molding on a wire, and the rotary body winds the wire for which the wire treatment has been performed by the wire treater.

What is claimed is:

1. A wire winding device comprising:

a rotary body that winds a wire by rotation; and a spacer provided on the rotary body and displaceable to a first position and a second position in the rotary body, wherein when the spacer is in the first position, the wire is wound on the rotary body not via the spacer, and hence the wire is wound with a first diameter, when the spacer is in the second position, the wire is wound on the rotary body via the spacer, and hence the wire is wound with a second diameter larger than the first diameter, the rotary body includes a support member including a U shape holding and supporting the wound wire in a direction parallel to a rotary shaft of the rotary body, when the spacer is in the first position, the wire is wound inside the support member not via the spacer, when the spacer is in the second position, the wire is wound inside the support member via the spacer, the support member including the U shape includes a pair of walls holding the wire in a direction parallel to the rotary shaft of the rotary body, and a bottom supporting the wire from a side of the rotary shaft of the rotary body, the pair of walls includes a movable side wall and a fixed side wall, the movable side wall is displaceable from a third position holding the wire to a fourth position different from the third position, when the movable side wall is in the fourth position, the wire wound on the rotary body can be removed from the rotary body by moving in a direction parallel to the rotary shaft of the rotary body, the spacer has a top surface and a bottom surface opposed to the top surface, the top surface support the wire when the spacer is in the second position, and the bottom surface abuts against the bottom of the support member when the spacer is in the second position.

2. A wire treatment system comprising:

the wire winding device according to claim 1; and a wire treater that performs a wire treatment including at least any of heat treatment and molding on a wire, wherein the rotary body winds the wire for which the wire treatment has been performed by the wire treater.

3. A wire winding device comprising:

a rotary body that winds a wire by rotation;

a spacer provided on the rotary body and displaceable to a first position and a second position in the rotary body;

an additional spacer provided on the rotary body and displaceable to the first position and the second position in the rotary body;

a rotary shaft coupled between the spacer and the additional spacer at proximal ends of the spacer and the additional spacer; and a rod member coupled between the spacer and the additional spacer at distal ends of the spacer and the additional spacer, wherein when the spacer is in the first position, the wire is wound on the rotary body not via the spacer, and hence the wire is wound with a first diameter, when the spacer is in the second position, the wire is wound on the rotary body via the spacer, and hence the wire is wound with a second diameter larger than the first diameter, the rotary body includes a support member including a U shape holding and supporting the wound wire in a direction parallel to a rotary shaft of the rotary body, when the spacer is in the first position, the wire is wound inside the support member not via the spacer, when the spacer is in the second position, the wire is wound inside the support member via the spacer, the support member including the U shape includes a pair of walls holding the wire in a direction parallel to the rotary shaft of the rotary body, and a bottom supporting the wire from a side of the rotary shaft of the rotary body, the pair of walls includes a movable side wall and a fixed side wall, the movable side wall is displaceable from a third position holding the wire to a fourth position different from the third position, when the movable side wall is in the fourth position, the wire wound on the rotary body can be removed from the rotary body by moving in a direction parallel to the rotary shaft of the rotary body, and when the spacer and the additional spacer are in the second position, the fixed side wall is located between the spacer and the additional spacer and is located between the rotary shaft and the rod member.

* * * * *